ing of this invention, however, will be readily apparent from the following detailed description of preferred embodiments thereof.

United States Patent [19]
Jonas

[11] 4,388,290
[45] Jun. 14, 1983

[54] PURIFYING THIONYL CHLORIDE WITH ALCL3 CATALYST

[75] Inventor: Gerhard Jonas, Leverkusen, Fed. Rep. of Germany

[73] Assignee: Bayer Aktiengesellschaft, Leverkusen, Fed. Rep. of Germany

[21] Appl. No.: 268,293

[22] Filed: May 28, 1981

[30] Foreign Application Priority Data

Jun. 19, 1980 [DE] Fed. Rep. of Germany ....... 3022879

[51] Int. Cl.³ ............................................. C01B 17/45
[52] U.S. Cl. ..................................... 423/468; 203/29; 203/51
[58] Field of Search ............... 423/468, 469, 472, 539; 203/51, 29

[56] References Cited

U.S. PATENT DOCUMENTS

| | | | |
|---|---|---|---|
| 2,529,671 | 11/1950 | Bissinger | 423/468 |
| 2,539,679 | 1/1951 | Trager | 423/468 |
| 3,155,457 | 11/1964 | Kunkel | 423/468 |
| 3,219,413 | 11/1965 | Kunkel | 423/469 |
| 3,592,593 | 7/1971 | Bohm | 423/468 |

FOREIGN PATENT DOCUMENTS

| | | | |
|---|---|---|---|
| 467679 | 8/1950 | Canada | 423/468 |
| 1272768 | 5/1972 | United Kingdom | 423/468 |

*Primary Examiner*—Brian E. Hearn
*Attorney, Agent, or Firm*—Sprung, Horn, Kramer & Woods

[57] ABSTRACT

In the purification of thionyl chloride by addition of sulphur and distillation in the presence of a catalyst, the improvement which comprises effecting the distillation in the presence of an aluminum compound as the catalyst. Advantageously the aluminum compound is aluminum chloride, the sulphur is added in about 2.5 to 7% by weight based on thionyl chloride, the aluminum chloride is in admixture with sulphur monochloride in about 0.01 to 5% by weight calculated as aluminum and based on thionyl chloride, and prior to distillation the mixture of crude thionyl chloride, sulphur and aluminum chloride is heated to between about 50° and 60° C. for about 10 to 60 minutes. The resulting thionyl chloride is of extremely high purity.

6 Claims, No Drawings

PURIFYING THIONYL CHLORIDE WITH ALCL₃ CATALYST

The present invention relates to a process for purifying thionyl chloride using aluminum compounds.

Thionyl chloride is produced commercially by reacting sulphur dioxide or sulphur trioxide with chlorine and sulphur chlorides in accordance with the following reaction equations:

$$S_2Cl_2 + 2SO_2 + 3Cl_2 \rightleftharpoons 4SOCl_2 \quad (I)$$

$$2SCl_2 + 2SO_2 + 2Cl_2 \rightleftharpoons 4SOCl_2 \quad (II)$$

$$S_2Cl_2 + SO_3 + 2Cl_2 \rightarrow 3SOCl_2 \quad (III)$$

$$2SCl_2 + SO_3 + Cl_2 \rightarrow 3SOCl_2 \quad (IV)$$

Sulphuryl chloride according to equation (II) can be used instead of sulphur dioxide and chlorine since sulphuryl chloride is in equilibrium with sulphur dioxide and chlorine:

$$SO_2Cl_2 \rightleftharpoons SO_2 + Cl_2 \quad (V)$$

The known processes based on reactions (I) to (IV) are described, for example, in German Patents DBP No. 803 411, DBP No. 842 041, DBP No. 939 571, DRP No. 136 870, DRP No. 139 455 and in U.S. Pat. No. 2,431,823. The reaction of the gaseous starting materials takes place in the presence of activated carbon at temperatures of between 160° and 300° C.

The untreated gaseous mixture produced is condensed, and the fractions of sulphur dioxide and chlorine which cannot be condensed at conventional coolant temperatures are again added to the starting materials in gaseous or liquid form as sulphuryl chloride (V).

The untreated crude thionyl chloride has approximately the following composition, depending on the reaction conditions:
65–85% thionyl chloride
10–25% sulphur dichloride and disulphur dichloride;
0.5–3% sulphur dioxide;
1–12% chlorine; and
0.05–0.5% sulphuryl chloride It is not possible in practice to separate the above-mentioned impurities, sulphur dichloride and sulphuryl chloride by distillation of the untreated thionyl chloride because sulphur dichloride (about 20°) as well as the sulphuryl chloride (about 10°) boil at a lower temperature than the thionyl chloride.

The crude thionyl chloride can however be partially purified by separating the sulphur dichloride and chlorine by reaction with sulphur (for example according to U.S. Pat. No. 3,155,457 as follows:

$$SCl_2 + S \rightarrow S_2Cl_2 \quad (VI)$$
and
$$Cl_2 + 2S \rightarrow S_2Cl_2 \quad (VII)$$

The above-mentioned reactions can be catalyzed by addition of catalysts, in particular iron salts, according to U.S. Pat. No. 3,592,593. The sulphur, optionally with the catalysts, is added to the thionyl chloride to be purified before or during distillation, which is generally a multiple stage process. The head product then contains about:
99.4% thionyl chloride;
0.05% sulphur dichloride and sulphur monochloride;
0.3% sulphuryl chloride; and
0.3% sulphur dioxide The sulphuryl chloride within this distillate is extremely difficult to remove, to do this, mostly there is necessary an extra purification step after distillation to do.

It has now surprisingly been found that aluminum compounds not only exert a desirable catalytic effect on reactions (VI) and (VII), but also split the sulphuryl chloride in the thionyl chloride substantially into sulphur dioxide and chlorine (reaction (V)).

The present invention therefore provides a process for purifying thionyl chloride by addition of sulphur in the presence of catalysts, which is characterized in that sulphur and an aluminum compound are added to the liquid thionyl chloride before and/or while it is worked up by distillation.

In this process, the sulphur is added in solid, liquid or dissolved form, in quantities of about 1–15% by weight, preferably about 2.5–7% by weight, particularly preferably about 4–6% by weight, based on thionyl chloride.

Suitable aluminum compounds in the context of the present invention include those aluminum compounds which form non-volatile complexes with thionyl chloride, preferably aluminum chloride. The aluminum chloride can be added in the form in which it contains some water of crystallization, but preferably in anhydrous form. Small quantities of aluminum compounds, i.e. about 0.01 to 1% by weight, preferably about 0.01 to 0.5% by weight and particularly preferably about 0.02 to 0.05% by weight aluminum compounds, calculated as aluminum and based on thionyl chloride are sufficient. Mixtures of aluminum compounds can also be used.

In one embodiment of the process, the sulphur and the aluminum compound are added to the untreated thionyl chloride prior to distillation and the resulting mixture is then treated for about 5–120 minutes, preferably 10–60 minutes at temperatures of from about 15° C. to about 80° C., preferably from about 50° C. to about 60° C. Conventional distillation is then carried out.

In most cases, a single treatment of the thionyl chloride under the conditions according to the invention is sufficient, while in other cases, and in order to obtain even greater purity in the thionyl chloride, the treatment can be repeated as necessary. The process according to the invention yields very pure thionyl chloride in a content of at least 99.7%.

In comparison with the known use of iron compounds, the use of aluminum compounds has great advantages.

In addition to the desirable catalytic influence on reactions (VI) and (VII), sulphuryl chloride is also split to form sulphur dioxide and chlorine, the latter being converted into sulphur monochloride by sulphur while the sulphur dioxide is removed as such during distillation. In particular, the aluminum chloride preferably used forms non-volatile, readily split complexes in the system so that it is only necessary to add very small quantities to the crude thionyl chloride as virtually no losses occur. During distillation of the crude thionyl chloride, the aluminum chloride builds up together with the monochloride in the sump of the column and can be reused if the sulphur monochloride is circulated in a suitable manner via the production of crude thionyl chloride.

In a preferred embodiment of the process, therefore, a partial stream of the sulphur monochloride together with the aluminum chloride is re-introduced to the crude thionyl chloride to be distilled. The crude thionyl chloride is preferably mixed in a container capable of being heated which is arranged upstream of the distillation column with a proportion of the sulphur needed and the aluminum-containing sulphur monochloride, a substantial proportion of the sulphur dichloride and of the sulphuryl chloride being decomposed. The remainer of the sulphur and of the aluminum chloride, possibly in the form of the $AlCl_3$-$S_2$/$Cl_2$ mixture again, is added during distillation.

The process described above is described in more detail in the following examples:

EXAMPLE 1

1 g of aluminum chloride was added, in the absence of water, to a mixture of 939 g of thionyl chloride, 241 g of sulphur dichloride, 48 g of chlorine, 26 g of sulphur dioxide, 60 g of sulphuryl chloride and 100 g of sulphur and the resulting mixture was heated to boiling for about 20 minutes. The mixture was then distilled over by means of a distillation column. The head product was again reacted with about 50 g of sulphur and 0.1 g of aluminum chloride, in the absence of water, and rectified via another column. The distillate contained: 1.82 g of sulphur dichloride (0.19%) and no sulphuryl chloride.

EXAMPLE 2

1 g of aluminum chloride was added in the absence of water to a mixture of 1000 g of thionyl chloride, 200 g of sulphur dichloride, 46 g of disulphur dichloride, 3.75 g of sulphuryl chloride and 100 g of sulphur. The mixture was worked up in the manner described in Example 1. The distillate contained: 0.21 g of sulphur dichloride (0.02%) and 0.4 g of sulphuryl chloride (0.04%).

EXAMPLE 3

10 g of aluminum chloride were added in the absence of water to a mixture as described in Example 2. The mixture was worked up as described in Example 1. The distillate contained: 0.32 g of sulphur dichloride (0.032%) and no sulphuryl chloride.

It will be appreciated that the instant specification and examples are set forth by way of illustration and not limitation, and that various modifications and changes may be made without departing from the spirit and scope of the present invention.

I claim:

1. In the purification of thionyl chloride by addition of sulphur and distillation in the presence of a catalyst, the improvement which comprises effecting the distillation in the presence of anhydrous aluminum chloride as catalyst.

2. A process according to claim 1, wherein the sulphur is added in about 1–15% by weight based on thionyl chloride.

3. A process according to claim 1, wherein the aluminum chloride is added in about 0.01 to 1% by weight calculated as aluminum and based on thionyl chloride.

4. A process according to claim 1, wherein prior to distillation the mixture of crude thionyl chloride, sulphur and aluminum chloride is heated to between about 15° C. and 80° C.

5. A process according to claim 1, wherein the aluminum chloride is added in admixture with sulphur monochloride.

6. A process according to claim 1, wherein the sulphur is added in about 2.5 to 7% by weight based on thionyl chloride, the aluminum chloride is in admixture with sulphur monochloride in about 0.01 to 5% by weight calculated as aluminum and based on thionyl chloride, and prior to distillation the mixture of crude thionyl chloride, sulphur and aluminum chloride is heated to between about 50° and 60° C. for about 10 to 60 minutes.

* * * * *